United States Patent
Dhawan et al.

(10) Patent No.: US 10,163,118 B2
(45) Date of Patent: Dec. 25, 2018

(54) METHOD AND APPARATUS FOR ASSOCIATING USER ENGAGEMENT DATA RECEIVED FROM A USER WITH PORTIONS OF A WEBPAGE VISITED BY THE USER

(71) Applicant: Adobe Systems Incorporated, San Jose, CA (US)

(72) Inventors: Anmol Dhawan, Uttar Pradesh (IN); Vikas Yadav, Uttar Pradesh (IN); Ashish Duggal, New Delhi (IN); Sachin Soni, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 776 days.

(21) Appl. No.: 14/624,956

(22) Filed: Feb. 18, 2015

(65) Prior Publication Data
US 2016/0239856 A1 Aug. 18, 2016

(51) Int. Cl.
*G06Q 30/02* (2012.01)
(52) U.S. Cl.
CPC ............... *G06Q 30/0203* (2013.01)
(58) Field of Classification Search
None
See application file for complete search history.

(56) References Cited

U.S. PATENT DOCUMENTS

| | | | |
|---|---|---|---|
| 2009/0037355 A1* | 2/2009 | Brave | G06F 17/30867 706/45 |
| 2010/0030578 A1* | 2/2010 | Siddique | G06Q 10/0637 705/3 |
| 2010/0125490 A1* | 5/2010 | Kiciman | G06Q 30/02 705/14.1 |
| 2013/0215116 A1* | 8/2013 | Siddique | G06Q 30/0643 345/420 |
| 2015/0074020 A1* | 3/2015 | Arpat | G06N 99/005 706/12 |
| 2016/0239856 A1* | 8/2016 | Dhawan | G06Q 30/0203 |

\* cited by examiner

*Primary Examiner* — Thomas L Mansfield
(74) *Attorney, Agent, or Firm* — Keller Jolley Preece

(57) ABSTRACT

A method for associating user engagement data with various features of a product associated with a webpage is provided. The method includes detecting a visit to a portion of the webpage by a user. The webpage includes features of the product. A feature from the portion of the webpage is then determined using keyword of the feature. The portion includes the keyword of the feature. A user engagement input is then received for entire webpage from the first user. The webpage includes only one user interface option to provide the user engagement input of a particular type, at an instance, for entire webpage. The user engagement input is associated with the feature and not associated with other features on the webpage. A report indicating association of the user engagement input with the feature and non-association of the user engagement input with other features on the webpage is then generated.

20 Claims, 10 Drawing Sheets

```
import nltk
raw = "WRITE RAW TEXT HERE"

#Normalization Starts
tokens = nltk.word_tokenize(raw) words
= [w.lower() for w in tokens]
porter = nltk.PorterStemmer() lancaster
= nltk.LancasterStemmer()
stemedwords_first_pass = [porter.stem(t) for t in words]  stemedwords_final_pass
= [lancaster.stem(t) for t in stemedwords_first_pass]
wnl = nltk.WordNetLemmatizer()
completely_normalized_words = [wnl.lemmatize(t) for t in stemedwords_final_pass]

#Normalization Ends, Part of Speech Tagging starts  pos_tagged_words
= nltk.pos_tag(completely_normalized_words)

#Extract Nouns & Proper Nouns in order of their frequency myDict
= dict()
for key, val in sorted(pos_tagged_words):
    if((val == 'NNP' or val == 'NN') and len(key) > 3): if(myDict.has_key(key)
       == False):
         myDict[key] = 1 else:
         myDict[key] = (myDict.get(key) + 1)

for word in sorted(myDict, key=myDict.get, reverse=True):
    if(myDict.get(word) > 0):
       print word + ":", myDict.get(word) #Print nouns/proper nouns whose occurrence is atleast
once
```

FIGURE 9

| LANGUAGE: English |
|---|
| Feature X looks impressive, Feature Y is awesome but Z looks useless |

| Click here to learn more about targeted sentiment. | | Visual JSON API | |
|---|---|---|---|
| Entities | Target | Type | Sentiment |
| Keywords | Entity Name | Entity | Positive |
| Taxonomy | | Entity | Neutral |
| Concepts | Feature X | Keyword | Positive |
| Document Sentiments | Feature Y | Keyword | Positive |
| Targeted Sentiment | Z | Keyword | Negative |

*Fig. 10*

METHOD AND APPARATUS FOR ASSOCIATING USER ENGAGEMENT DATA RECEIVED FROM A USER WITH PORTIONS OF A WEBPAGE VISITED BY THE USER

BACKGROUND

Currently available techniques allow a user to provide feedback on webpages via various options such as "share", "like", "comment", and "ratings". The feedback is then collated, by marketing tools, and provided to a marketer to indicate how the webpage is performing. For example, the feedback includes number of likes that the webpage received, average rating that the webpage received, number of times the webpage was shared, and the like. However, such feedback is linked to entire webpage and the marketer is not able to relate such feedback to various portions of the webpage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for associating user engagement data with various features of a product associated with a webpage is provided. The method includes detecting a visit to a portion of the webpage by a user. The webpage includes features of the product. A feature from the portion of the webpage is then determined using keyword of the feature. The portion includes the keyword of the feature. A user engagement input is then received for entire webpage from the first user. The webpage includes only one user interface option to provide the user engagement input of a particular type, at an instance, for entire webpage. The user engagement input is associated with the feature and not associated with other features on the webpage. A report indicating association of the user engagement input with the feature and non-association of the user engagement input with other features on the webpage is then generated.

A method for associating user engagement data with various portions of a webpage is also provided. A visit to a first portion and a second portion of the webpage by a first user is detected. A first content from the first portion and a second content from the second portion of the webpage is then determined. A first user engagement input for the webpage is received from the first user. The first user engagement input is associated with the first content and the second content. A visit to the second portion of the webpage by a second user is then detected. The second content is determined from the second portion. A second user engagement input for the webpage is received from the second user. The second user engagement input is associated with the second content. A report indicating association of the first user engagement input with both the first content and the second content, and association of the second user engagement input with the second content is then generated.

Apparatuses for substantially performing the methods as described herein are also provided.

BRIEF DESCRIPTION OF THE DRAWINGS

FIG. 9 is a description of a script for determining feature from a portion of a webpage, according to one or more embodiments; and FIG. 10 is a diagram of an output of keyword level sentiment engine, according to one or more embodiments.

Figure 1:
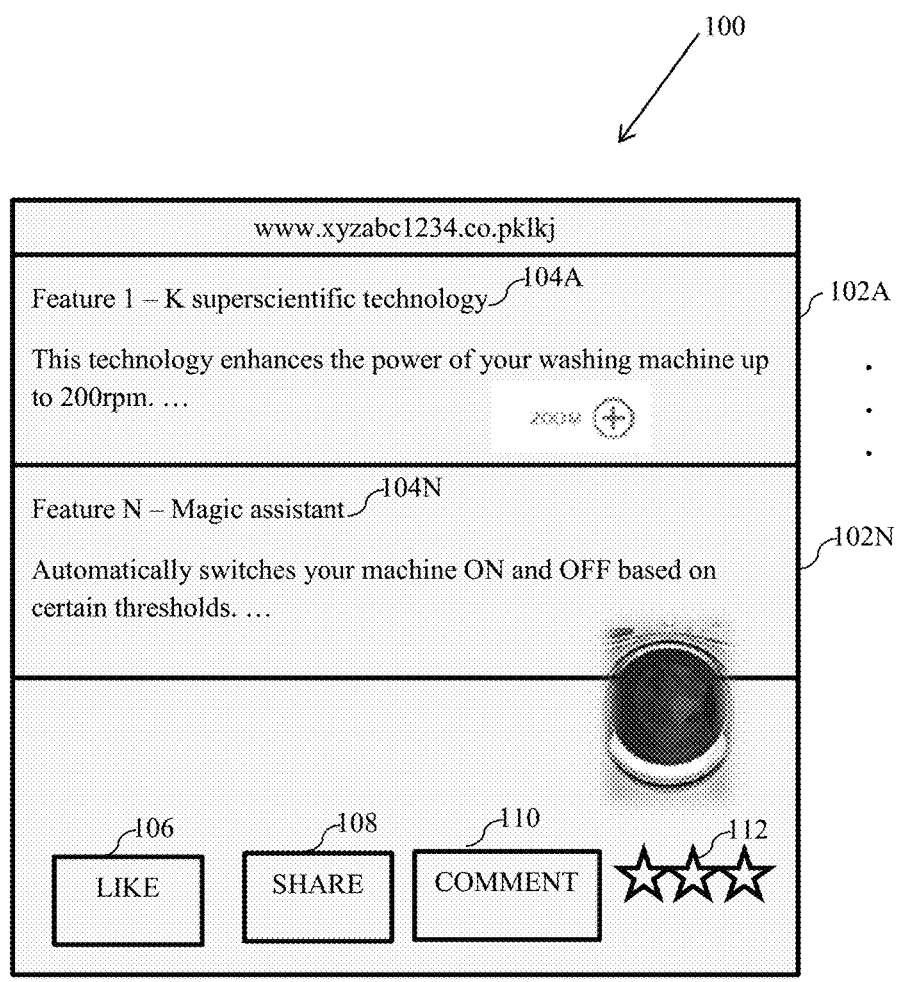
FIG. 1 is a diagram of a webpage, according to one or more embodiments.

While the procedure and apparatus is described herein by way of example for several embodiments and illustrative drawings, those skilled in the art will recognize that the procedure and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

One prior procedure for providing feedback to a marketer regarding performance of a webpage includes tracking number of likes received by the webpage, tracking number of shares received by the webpage, tracking number of comments received by the webpage, tracking ratings received by the webpage, and generating a report based on the tracking However, such feedback is incomplete because the marketer is not able to associate the feedback with various portions of the webpage but to the entire webpage. For example, if the webpage includes a product along with features of the product then the marketer would like to know granular aspects of the feedback, such as which feature of the product is driving users to like the webpage, which feature is driving higher rating for the webpage etc. Therefore, there remains an unmet need to associate user engagement data (feedback) received from the user with the portions of the webpage visited by the user, and to generate a report based on association.

Another prior procedure for providing feedback to the marketer regarding performance of the webpage includes providing multiple user interface options (clickable buttons or links) of same type against each portion of the webpage, tracking feedback received via each user interface option, and generating a report based on the tracking For example, providing a first "share" button for sharing a particular portion of the webpage, and providing a second "share" button for sharing another portion of the webpage. Such prior procedure is commonly present in Facebook where a "share" button is present against each post or each comment. However, such prior procedure consumes real state of the webpage, and poses an additional burden on a developer and the marketer of the webpage to determine locations for placing such user interface options on the webpage. With more and more webpages being consumed on mobile devices, the real estate needs to be used judiciously and such prior procedure compromises on saving the real estate. Therefore, there remains an unmet need to associate user engagement data (feedback) received from the user with the portions of the webpage visited by the user, and to generate a report based on association.

In accordance to embodiments of the present invention and as described in more detail below, a procedure for associating user engagement data, received from a user, with portions of a webpage visited by the user is provided. The webpage includes description of a product and of features of the product. The description of the features of the product constitute multiple portions of the webpage. The webpage is visited by the user and the portion on which the user spends a time greater than a predefined threshold is detected as the portion visited by the user. Content corresponding to the portion visited by the user is extracted and processed through natural language processing engine to determine keywords. The keywords indicate the feature present in the portion of the webpage and are used to determine the feature of the product visited by the user. User engagement input for the entire webpage is then received from the user. The user engagement input is of various types, such as "share", "like", "comment", "rating", and the like. The webpage includes one user interface option (button or link) of a particular type, at any instant, using which the feedback for the entire webpage is received. For example, the webpage includes one "share" type user interface option, one "like" type user interface option, one "comment" type user interface option, and one "rating" type user interface option etc. which when clicked upon by the user at any instance provides the feedback for the entire webpage. The user engagement input is then associated with the feature visited by the user and is not associated with other features present on the webpage. The user engagement inputs from multiple users are received and collated. A count of each type of the user engagement input is maintained for each feature. A report indicating the count is then provided to the marketer. The report indicates association of the user engagement input with the feature visited by the user and non-association of the user engagement input with other features of the webpage. In one visit multiple portions can be visited upon by the user and all such portions can be processed to determine features visited by the user. The user engagement input is then associated with all such features visited by the user and is not associated with remaining features of the webpage. Similarly, more than one type of user engagement input can be received from the user.

Figure 2:
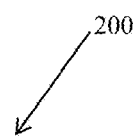
FIG. 2 is a diagram of a report, according to one or more embodiments.

FIG. 1 shows a sample webpage 100 which is visited by the user. The webpage 100 includes multiple portions 102a-102n, with each portion corresponding to a feature from features 104a-104n. The webpage 100 also includes one user interface option of each type, such as a "share" option 106, a "like" option 108, a "comment" option 110, and a "rating" option 112, for providing feedback for entire webpage 100 by the user. FIG. 2 shows a sample report 200 indicating association of the user engagement inputs (collectively referred to as user engagement data) with various portions, i.e. features of the product, of the webpage. The report 200 indicates that a total of 108 shares were performed for the webpage 100. Meaningful and granular details are available to the marketer from the report 200, such as feature 1 drove 102 users to share the webpage 100.

Advantageously, providing meaningful and granular details of the user engagement with the portions of the webpage helps marketer in reorganizing content of the webpage and in turn deriving better engagement from the users.

Terms Definitions (In Addition to Plain and Dictionary Meaning of the Terms)

A webpage is an electronic page including content about an entity. The webpage is hosted using a server and is accessible using a uniform resource locator (URL). The webpage includes various portions with each portion including content about the entity. For example, the webpage is a product page including features (content) of a product (entity). In another example, the webpage includes products (content) of a brand (entity). In yet another example, the webpage includes a blog page including features (content) of a product (entity). The webpage includes one user interface option of a particular type, at an instant, using which the feedback for entire webpage is received.

A user is an entity or a person visiting the webpage and engaging with the content of the webpage. The user interacts with the webpage and provides user engagement inputs of various types. Examples of the types of the user engagement inputs include, but are not limited to, "share", "like", "comment", "rating", or a combination of one or more of these. The user provides the user engagement input for the entire webpage by interacting with the user interface options present on the webpage.

A user engagement input is an input received in response to an electronic activity performed by the user on the webpage. The user provides the user engagement input for the entire webpage by interacting with the user interface options present on the webpage. The user engagement input is of various types. Examples of the types of the user engagement inputs include, but are not limited to, "share", "like", "comment", "rating", or a combination of one or more of these. A plurality of user engagement inputs is referred to as user engagement data.

A marketer is an entity or a person who manages the webpage, or who has authority to do so. A marketer can be any personnel who is tasked with managing the webpage and increasing engagement of the user with the webpage. A marketer uses a marketing tool, such as Adobe Experience Manager, for managing the webpage and determining how the webpage is performing. The marketing tool tracks engagement of various users with the webpage and generates reports for the marketer indicating the user engagement reports with various portions of the webpage.

In the following discussion, an example environment is first described that is operable to employ techniques described herein. Following this, a section entitled "Example Procedures" describes some example procedures in accordance with one or more embodiments. Finally, a section entitled "Example Snapshots" indicates snapshots related to the example procedures in accordance with one or more embodiments.

Example Environment

Figure 3:
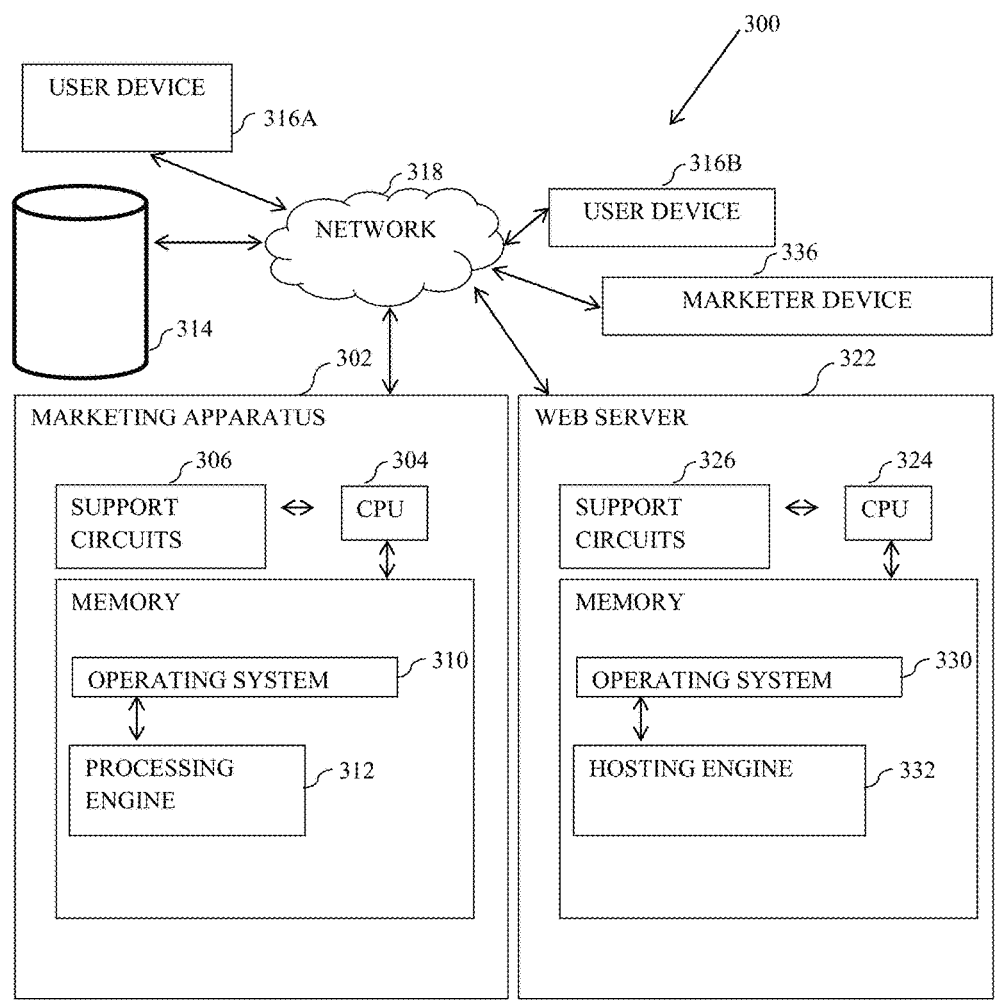
FIG. 3 is an environment for associating user engagement data received from a user with portions of a webpage visited by the user, according to one or more embodiments.

FIG. 3 is a diagram of an environment 300 for associating user engagement data received from a user with various portions of a webpage visited by the user, according to one or more embodiments. The environment 300 includes one or more user devices, such as a user device 316A and a user device 316B. The user devices can communicate with a web server apparatus 322 (hereinafter referred to as the apparatus 322) via a network 318. The environment 300 also includes one or more marketer devices (hereinafter referred to as the marketer devices), such as a marketer device 336. The marketer devices can communicate with a marketing apparatus 302 (hereinafter referred to as the apparatus 302) via the network 118. The environment 300 also includes a storage device 314 accessible via the network 318, or directly by the apparatus 302.

Hardware Description

Examples of the apparatus 302 include, but are not limited to, a desktop computer, server, a combination of one or more servers, or any other electronic device having one or more processors. The apparatus 302 can be present at one single location or can be present at different locations in a distributed environment.

The apparatus 302 includes a Central Processing Unit (CPU) 304, support circuits 306, and a memory 308. The CPU 304 may include one or more commercially available microprocessors or microcontrollers that facilitate data processing and storage. The various support circuits 306 facilitate the operation of the CPU 304 and include one or more clock circuits, power supplies, cache, input/output circuits, and the like. The memory 308 may include at least one of Read Only Memory (ROM), Random Access Memory (RAM), disk drive storage, optical storage, removable storage or the like. The memory 308 includes an operating system 310, and a processing engine 312. The operating system 310 may include various commercially known operating systems.

The apparatus 302 may further include one or more input devices (not shown in FIG. 3) connected to the apparatus 302. Examples of the one or more input devices include, but are not limited to, peripheral devices, keyboard, mouse etc. In some embodiments, the apparatus 302 may not be connected to the input devices separately and may have functionalities of these input devices built into the apparatus 302, such as in cases in which the apparatus 302 is touch enabled device, gesture enabled device, or paired to such similar devices that act as the input devices.

The storage device 314 is, for example, a storage drive or a storage system, or a distributed or shared storage system.

Examples of the apparatus 322 include, but are not limited to, a desktop computer, server, a combination of one or more servers, or any other electronic device having one or more processors. The apparatus 322 can be present at one single location or can be present at different locations in a distributed environment.

The apparatus 322 includes a Central Processing Unit (CPU) 324, support circuits 326, and a memory 328. The CPU 304 may include one or more commercially available microprocessors or microcontrollers that facilitate data processing and storage. The various support circuits 326 facilitate the operation of the CPU 324 and include one or more clock circuits, power supplies, cache, input/output circuits, and the like. The memory 328 may include at least one of Read Only Memory (ROM), Random Access Memory (RAM), disk drive storage, optical storage, removable storage or the like. The memory 328 includes an operating system 330, and a hosting engine 332. The operating system 330 may include various commercially known operating systems.

The apparatus 322 may further include one or more input devices (not shown in FIG. 3) connected to the apparatus 322. Examples of the one or more input devices include, but are not limited to, peripheral devices, keyboard, mouse etc. In some embodiments, the apparatus 322 may not be connected to the input devices separately and may have functionalities of these input devices built into the apparatus 322, such as in cases in which the apparatus 322 is touch enabled device, gesture enabled device, or paired to such similar devices that act as the input devices.

Examples of the user devices include, but are not limited to, a desktop computer, a smartphone, a tablet computer, a laptop computer, a mobile computer or any other electronic device having one or more processors. Each user device includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. Each user device may further include one or more input devices connected to the corresponding viewer device. Examples of the one or more input devices include, but are not limited to, peripheral devices, keyboard, mouse etc. In some embodiments, the viewer device may not be connected to the input devices separately and may have functionalities of these input devices built into the user device, such as in cases in which the user device is touch enabled device, gesture enabled device, or paired to such similar devices that act as the input devices.

Examples of the network 318 include, but are not limited to, internet, local area network (LAN), wireless area network, wired area network etc.

Examples of the marketer devices include, but are not limited to, a desktop computer, a smartphone, a tablet computer, a laptop computer, a mobile computer or any other electronic device having one or more processors. The marketer device 136 includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. The marketer device 136 may further include one or more input devices connected to the marketer device 136. Examples of the one or more input devices include, but are not limited to, peripheral devices, keyboard, mouse etc. In some embodiments, the marketer device 336 may not be connected to the input devices separately and may have functionalities of these input devices built into the marketer device 336, such as in cases in which the marketer device 336 is touch enabled device, gesture enabled device, or paired to such similar devices that act as the input devices.

Functional Description

The functional working of the environment 300 is now explained.

A marketer of an entity uses services offered by the apparatus 302 to manage website of an entity. The marketer accesses the services of the apparatus 302 by maintaining an account with the apparatus 302. Example of the service includes Adobe Experience Manager and example of the apparatus 302 includes a marketing server maintained by an entity offering marketing or analytical tools. The marketer logs into the service via the marketer device 336 and accesses the website. In one embodiment, the website is hosted using the processing engine 312 of the apparatus 302. In other embodiment, the website is hosted using the hosting engine 332 of the apparatus 322 and using the apparatus 302, or the website is powered by the services of the apparatus 302, i.e. the apparatus 322 is in electronic communication with the apparatus 302 to enable workflows, functioning, and managing of the website. Example of the apparatus 322 includes a webserver maintained by the entity. The marketer can create the website using the services of the apparatus 302, manage the website, and also obtain reports on how the website is performing using the services of the apparatus 302. The marketer can also enable social interactions with users of the website using the services of the apparatus 302. For example, the marketer can add various user interface options of various types on the website. In one embodiment, the marketer adds only one user interface option per type on a webpage to gather feedback for entire webpage at an instant. One user interface option is added for each type. Some types may be omitted based on preference of the marketer. The website including the webpage and the user interface options is then published and is accessible via a uniform resource locator (URL).

A user accesses the website via the user device 316A using the URL. In illustrated example, the entity is a washing machine manufacturer and the marketer creates the webpage for a washing machine sold by the entity. The webpage (an example shown in FIG. 1) includes various features of the washing machine, and the user interface options to provide feedback for entire webpage. The user visits various portions of the webpage and spends some time on each portion. The user may go through content of some portions of the webpage in detail and may skip some of the portions. The user interaction with portions of the webpage is tracked and stored in a tag or cookie on the user device 316A. The tag or the cookie is then sent to the apparatus 302 directly or via the apparatus 322 based on setting. The tracking is enabled using JavaScript code embedded in the webpage or using any other technology that supports tracking. The interaction can be tracked using eye tracking technology or using scroll behavior of the user. In either case, coordinates of the portion that the user visits and time spent on the coordinates are tracked and stored in the tag. The tag is placed on the user device 316A by the apparatus 302 or the apparatus 322. In addition, the user clicks on one or more user interface options of various types to provide user engagement input or data. The user engagement input is also stored in the tag. At any instant of time, only one user interface option of one type is accessible to the user to provide feedback for the entire page. For example, the webpage includes only one "share" button at an instant of time for selection by the user to provide feedback for the entire webpage. There may be other "share" button to provide feedback for specific portion of the webpage, if provided by the marketer or the developer, but not for the entire webpage.

The tag is then received and processed by the processing engine 312. The processing engine 312 parses the tag, and determines coordinates of various portions of the webpage visited by the user and corresponding time spent on each portion. The portions on which time spent is greater than a predefined threshold are detected as the portions visited by the user and remaining portions are detected as the portions not visited by the user. The content of the portions visited by the user is extracted and processed using a natural language processor. The natural language processor is a part of the processing engine 312. The natural language processor parses the content and determines one or more keywords from each portion. The keywords indicate a feature of the washing machine described in corresponding portion of the webpage. Each portion corresponds to one or more keywords which indicate the feature of the washing machine described in that portion. The feature of the washing machine described in each portion is determined using the natural language processor. The user engagement data or input is then processed by the processing engine 312. A list of various types of user engagement input is maintained for each feature. Initially, the count is set to zero for all types of user engagement input and the count is incremented based on the received user engagement input. For example, if the user clicks on "share" button and a feature X corresponding to a portion X of the webpage is identified as the portion visited by the user then the count of "share" under feature X is incremented by one. The received user engagement data is processed and associated with all the features determined to be visited by the user and is not associated with the features determined to be not visited by the user.

In various embodiments, the processing of the user engagement data depends on type of user engagement input. In one example, if the type includes comment then the processing engine 312 further determines whether the received "Comment" from the user includes the keyword corresponding to the feature. If the "Comment" does not include the keyword corresponding to the feature then the processing engine 312 determines sentiment score of the "Comment" and associates the sentiment score with the feature. However, if the "Comment" includes the keyword corresponding to the feature then the processing engine 312 determines sentiment score of the keyword corresponding to the feature from the "Comment" and associates the sentiment score of the keyword with the feature. In another example, if the type of the user engagement input also includes Rating in addition to the "Comment" then the received rating from the user is associated with the feature based on the sentiment score of the keyword corresponding to the feature and average of sentiment scores of every other feature mentioned in the "Comment".

Various techniques can be used for determining sentiment of the "Comment" or of the keyword in the "Comment" and have been described in detail in "Example Procedures" section.

The user engagement data is collected for number of users and accumulated. The marketer logs into the services of the apparatus 302 at any point of time to generate various reports, such as that shown in FIG. 2. The reports are indicative of association of the user engagement data received from the user with the portions of the webpage visited by the user and non-association of the user engagement data with other portions of the webpage not visited by the user. The report is generated by the apparatus 302. The report includes collation of the user engagement data received from different users.

In one embodiment, the user (first user) of the user device 316A visits the webpage and spends some time on a first portion and a second portion of the webpage. The first portion corresponds to a first feature of the washing machine and the second portion corresponds to a second feature of the washing machine. The first portion and the second portion can be any two portions of the webpage. The processing engine 312 detects a visit to the first portion and the second portion of the webpage by the first user. The processing engine 312 then determines the first content from the first portion and the second content from the second portion of the webpage. The first content is description of the first feature on the webpage and the second content includes description of the second feature on the webpage. The processing engine 312 also receives a user engagement input (first user engagement input) for the webpage from the first user. The first user engagement input is then associated with the first content and the second content. Similarly, the user (second user) of the user device 316B visits the second portion of the webpage. The processing engine 312 detects the visit to the second portion of the webpage by the second user. The processing engine 312 determines the second content from the second portion and also, receives a user engagement input (second user engagement input) for the webpage from the second user. The processing engine 312 further associates the second user engagement input with the second content, and generates a report indicating association of the first user engagement input with both the first content and the second content, and association of the second user engagement input with the second content. The report is accessible by the marketer after logging into the services provided by the apparatus 302.

The algorithms and procedures for performing various operations of the apparatus 302 and the apparatus 322 are now explained in conjunction with example procedures.

Example Procedures

Figure 4:
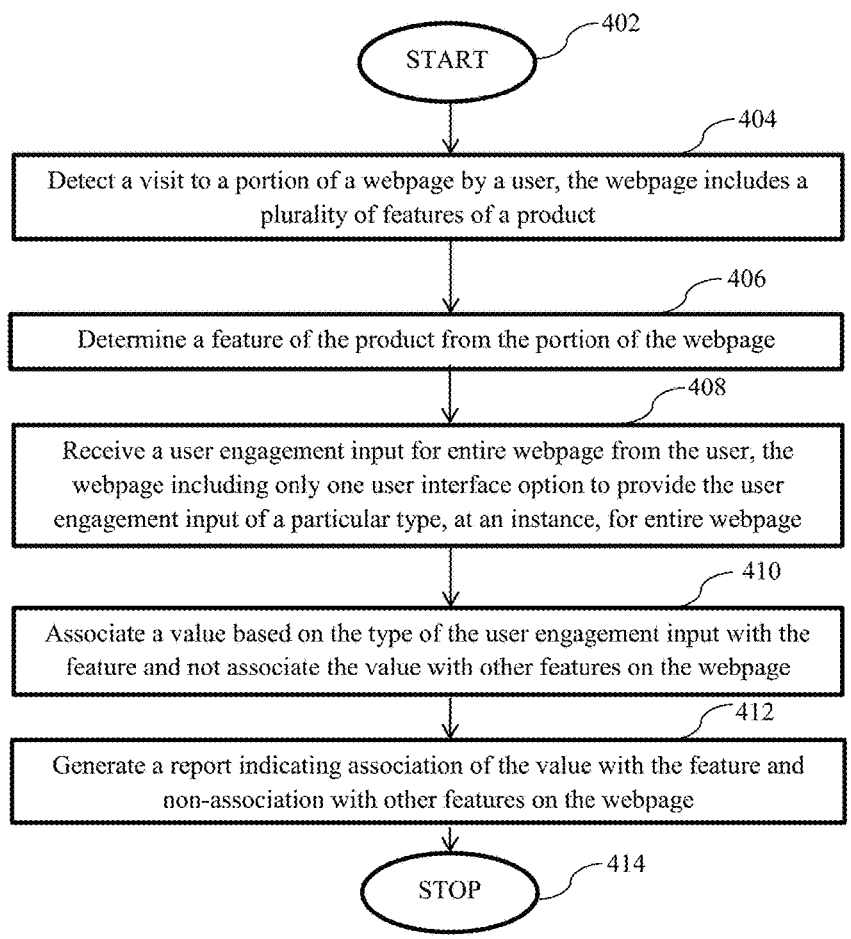
FIG. 4 is a flowchart of a procedure for associating user engagement data received from a user with portions of a webpage visited by the user, according to one or more embodiments.

FIG. 4 is a flowchart of a procedure for associating user engagement data received from a user with portions of a webpage visited by the user by an apparatus, such as the apparatus 302 of FIG. 3, according to one or more embodiments. The procedure is explained with help of a webpage. The webpage is a product page, i.e. a webpage describing and associated with a product. The webpage includes a plurality of features of the product. Various portions of the webpage correspond to various features of the product. The webpage is enabled for tracking by a marketer of the product. The marketer also enables report generation of social activities performed by a user on the webpage via the apparatus 302.

The procedure starts at step 402 and proceeds to step 404.

At step 404, a visit to a portion of the webpage by the user is detected. The user is said to visit the portion of the webpage if the time spent by the user on the portion is greater than a predefined threshold. Coordinates of the portion visited by the user and the time spent on the portion is received from device of the user. Various technologies can be used for receiving such details from the device of the user. For example, JavaScript can be embedded in the webpage by the marketer or developer of the webpage to enable sending of such details by the device of the user to the apparatus 302. Alternatively, cookies can be used to collect such data on the device of the user and to provide such data to the apparatus 302. In yet another embodiment, use of beacons which are small pixel images inserted in the webpage can be used to provide such data to the apparatus 302. The cookie can be placed by the apparatus 302 or the apparatus 322 on the device of the user. For tracking the coordinates, various existing technologies, such as eye tracking or tracking mouse cursor of the user or tracking scroll behavior of the user, can be used. An application can also be used to track such details on the device of the user and to send the details to the apparatus 302.

At step 406, a feature of the product is determined from the portion of the webpage. The content from the portion visited by the user is extracted using the coordinates and the content is processed to determine one or more keywords from the portion. The keywords are representative of the feature of the product described in the portion of the webpage and are used to determine the feature from the portion of the webpage visited by the user. The keywords can be determined using various existing technologies, such as natural language processing. In one embodiment, a part of speech tagger (POS) trained on product's content or brand's content is used to identify keywords of the portion of the webpage. Examples of such POS includes, but are not limited to, Natural Language Toolkit (NLTK) POS etc. An exemplary way in which such POS works includes tokenizing the content of the portion of the webpage. The tokenized content is then converted to lower case. The conversion is then followed by stemming. Stemming is the process of finding stems of the words by reducing derived or infected words to their root or stems. NLTK POS offers two stemmers, Ported and Lancaster. Either can be used for performing the stemming. Stemming is then followed by lemmatization. Lemmatization is the process of grouping together different inflected forms of a word so that the group can be analyzed as a single item. Lemmatization is followed by POS tagging. POS tagging is the process of classifying words into parts of speech and labeling the words accordingly. Output of the POS tagging indicates whether a word is a noun, proper noun, verb adjective, pronoun, article etc. The nouns and proper nouns indicate subjects and hence, the nouns and proper nouns are organized in order of their frequency in normalized text. The normalized text is obtained after tokenizing, stemming and lemmatizing. The noun or proper noun with frequency above desired frequency or with highest frequency is determined to be representative of the feature of the portion of the webpage. A script used for determining the feature from the portion of the webpage is provided in FIG. 9.

At step 408, user engagement input is received for entire webpage from the user and at step 410 the user engagement input (a value based on the type of the user engagement input) is associated with the feature and is not associated with other features of the webpage not visited by the user. Examples of the value include, but are not limited to, a numerical value, a non-numerical value, a Yes or No type value, a score or any other way of associating the user engagement input with the feature. The webpage includes only one user interface option to provide the user engagement input of a particular type, at one instance, for entire webpage. The user engagement input is received by the apparatus 302 using the JavaScript or the cookie based technology or other existing technologies. The user engagement input includes a click on the "like" button or on the "share" button or an input comment or a rating or a combination of these. A count corresponding to each feature is maintained for each type of the user engagement input. The webpage is initially parsed and processed using the natural language processing technology to determine all features of the product described on the webpage. Alternatively, the marketer can provide the list of all features. Variables corresponding to each type are initialized for each feature. Examples of variable include, but are not limited to, Num_Likes, Num_Shares, Num_Comments, Sentiment, Num_rating, and Rating. With each user engagement input received for the feature the count is incremented for corresponding type of the received user engagement input.

For example, if the user visits feature X and likes the webpage then the count under Num_Likes for feature X is incremented by 1 while the count under Num_Likes for other features on the webpage not visited by the user remains unaltered.

Similarly, if the user visits feature X and shared entire webpage then the count under Num_Shares is increment by 1 for feature X and not for other features.

If the user visits feature X and comments on the webpage then the comment is processed using the natural language processing techniques to determine one or more keywords from the comments. If any of determined keyword is not present in the keywords of the feature then sentiment score of the comment is determined. The sentiment score is determined using various existing techniques. In one example, machine learning algorithm based on natural language processing (NLP) including lexicon based prediction is used. The lexicon based sentiment engine can make use of NLP or lexicons to understand the text and extract the sentiment into 3 categories: positive, negative and neutral. In another embodiment, other sentiment engine such as one available from Semantria can be used. The sentiment score can be a numerical value or can be a category of value such as HIGH, LOW, MEDIUM, POSITIVE etc. The sentiment score can also be a range or a normalized value. The sentiment score is then associated with the feature. In one embodiment, the sentiment score is associated using following equation with the feature:

New sentiment score of the feature=[(Initial sentiment score of the feature*(Num_Comments−1))+Sentiment score]/Num_Comments However, if at least one determined keyword from the comment is equal to at least one keyword of the feature then the sentiment score of such keyword is determined. Various existing techniques can be used for determining sentiment of a keyword in a sentence, such as the technique provided by Alchemy API can be used in one embodiment. FIG. 10 shows a snapshot of such technique (algorithm) for determining keyword level sentiment. A sentence is inputted and an output indicating sentiment score for each keyword is outputted. The sentiment score for the keyword can further be refined using following equation:

Sentiment score of the keyword=[((1−W)*Sentiment score of the comment)+(W*Sentiment score of keyword outputted from the algorithm))], where W is the weight that can be optionally specified by the marketer and is indicative of the weight that should be assigned to the sentiment of the keyword in the comment. A default value can also be set for W.

In another embodiment, sentiment engine which can detect, extract and weight sentence affect and sentiment signal using a general purpose sentiment vocabulary combined with a NLP engine can be used. The sentiment score of the keyword is then associated with the feature. In one embodiment, the sentiment score is associated using following equation with the feature:

New sentiment score of the feature=[(Initial sentiment score of the feature * (Num_Comments−1))+Sentiment score of keyword in comment]/Num_Comments The count of the Num_Comments is also incremented by 1 for the visited feature. If the comment includes more than one feature or keywords for more than one feature then the association is determined using described equations and associated with respective features.

Similarly, if the user visits feature X and provided rating for entire webpage then the count under Num_Ratings is increment by 1 for feature X and not for other features.

If the user visits feature X and provides both rating and comment for entire webpage then the comment is processed as described previously, and the rating is associated with feature X based on the sentiment score of the keyword corresponding to the feature and average of sentiment scores of every other feature present in the comment. The association is performed using following equation:

Associated rating=[(Rating user provided)*Sentiment score of the feature in the comment]/(Average sentiment of all features in the comment)

For example, if the user gave a rating of 3 and mentioned about two features F1 and F2, and for F1, if keyword level sentiment score is 9 (on a scale of 1-10) and for F2 the sentiment score is 5 then the rating of 3 would be associated as follows:

For F1, associated rating=3*9/7=3.86
For F2, associated rating=3*5/7=2.14

In some embodiments, in case more than one keyword is representative of the feature then the variables corresponding to each type of the user engagement input is maintained for each keyword. The count is then incremented for each variable for each keyword. For example, if there are keyword 1 and keyword 2 for feature X visited by the user and the user likes the webpage then the count under Num_Likes is incremented by 1 for each of the keyword 1 and the keyword 2. Also, if one keyword corresponds to multiple features then the association is performed for all such features including at least one determined keyword in the portion of the webpage.

At step 412, the report indicating association of the user engagement input or the user engagement data with the feature and non-association of the user engagement input or the user engagement data with other features of the webpage is generated. The report can be generated and stored for rendering as and when required by the marketer or can be generated in real time. The marketer can access an online portal provided by the apparatus 302 for accessing the services offered by the apparatus 302. Using the online portal and offered user interface of the online portal, the report is accessed by the marketer. The report includes granular analysis of the user engagement data and helps marketer in altering the webpage in a more meaningful manner.

The procedure stops at step 414.

Figure 5:
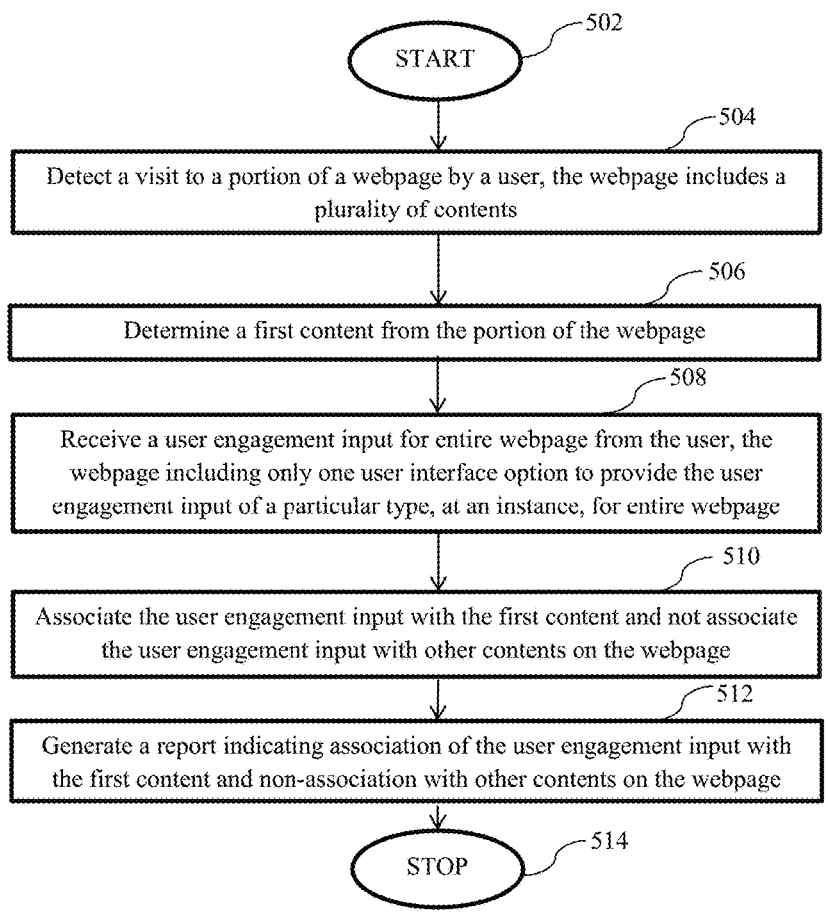
FIG. 5 is a flowchart of another procedure for associating user engagement data received from a user with portions of a webpage visited by the user, according to one or more embodiments.

FIG. 5 is a flowchart of a procedure for associating user engagement data received from a user with portions of a webpage visited by the user by an apparatus, such as the apparatus 302 of FIG. 3, according to one or more embodiments. The procedure is explained with help of a webpage. In one example, the webpage can be a product page, i.e. a webpage describing and associated with a product, and including a plurality of features (plurality of contents) of the product. In another example, the webpage can be a brand page, i.e. a webpage describing and associated with a brand, and including a plurality of products (plurality of contents) of the brand. In yet another example, the webpage can be a blog page, i.e. a webpage blogging about and associated with a product, and including a plurality of features (plurality of contents) of the product. In still another example, the webpage can be a blog page, i.e. a webpage blogging about and associated with a brand, and including a plurality of products (plurality of contents) of the brand. The webpage is enabled for tracking by a marketer of the product or brand. The marketer also enables report generation of social activities performed by a user on the webpage via the apparatus 302.

The procedure starts at step 502 and proceeds to step 504.

At step 504, a visit to a portion of the webpage by the user is detected. The webpage includes the plurality of contents. The user is said to visit the portion of the webpage if the time spent by the user on the portion is greater than a predefined threshold. Coordinates of the portion visited by the user and the time spent on the portion is received from device of the user. Various technologies, as described earlier in FIG. 4, can be used for receiving such details from the device of the user.

At step 506, a first content from the plurality of contents is determined from the portion of the webpage. The first content from the portion visited by the user is extracted using the coordinates and the first content is processed to determine one or more keywords from the portion. The keywords are representative of the first content described in the portion of the webpage and are used to determine the first content from the portion of the webpage visited by the user. The keywords can be determined using various existing technologies, as described earlier in FIG. 4.

At step 508, user engagement input is received for entire webpage from the user and at step 510 the user engagement input is associated with the first content and is not associated with other contents of the webpage not visited by the user. The webpage includes only one user interface option to provide the user engagement input of a particular type, at one instance, for entire webpage. The user engagement input is received by the apparatus 302 using the JavaScript or the cookie based technology or other existing technologies. The user engagement input includes a click on the "like" button or on the "share" button or an input comment or a rating or a combination of these. A count corresponding to each feature is maintained for each type of the user engagement input. The webpage is initially parsed and processed using the natural language processing technology to determine all contents described on the webpage. Alternatively, the marketer can provide the list of all contents. Variables corresponding to each type are initialized for each content. Examples of variable include, but are not limited to, Num_Likes, Num_Shares, Num_Comments, Sentiment, Num_rating, and Rating. With each user engagement input received for the first content the count is incremented for corresponding type of the received user engagement input. The procedure of associating the user engagement input or the user engagement data with the first content is described earlier in FIG. 4.

In some embodiments, in case more than one keyword is representative of the first content then the variables corresponding to each type of the user engagement input is maintained for each keyword. The count is then incremented for each variable for each keyword. For example, if there are keyword 1 and keyword 2 for first content X visited by the user and the user likes the webpage then the count under Num_Likes is incremented by 1 for each of the keyword 1 and the keyword 2. Also, if one keyword corresponds to multiple contents then the association is performed for all such contents including at least one determined keyword in the portion of the webpage.

At step 512, the report indicating association of the user engagement input or the user engagement data with the first content and non-association of the user engagement input or the user engagement data with other contents of the webpage is generated. The report can be generated and stored for rendering as and when required by the marketer or can be generated in real time. The marketer can access an online portal provided by the apparatus 302 for accessing the services offered by the apparatus 302. Using the online portal and offered user interface of the online portal, the report is accessed by the marketer. The report includes granular analysis of the user engagement data and helps marketer in altering the webpage in a more meaningful manner.

The procedure stops at step 514.

Figure 6:
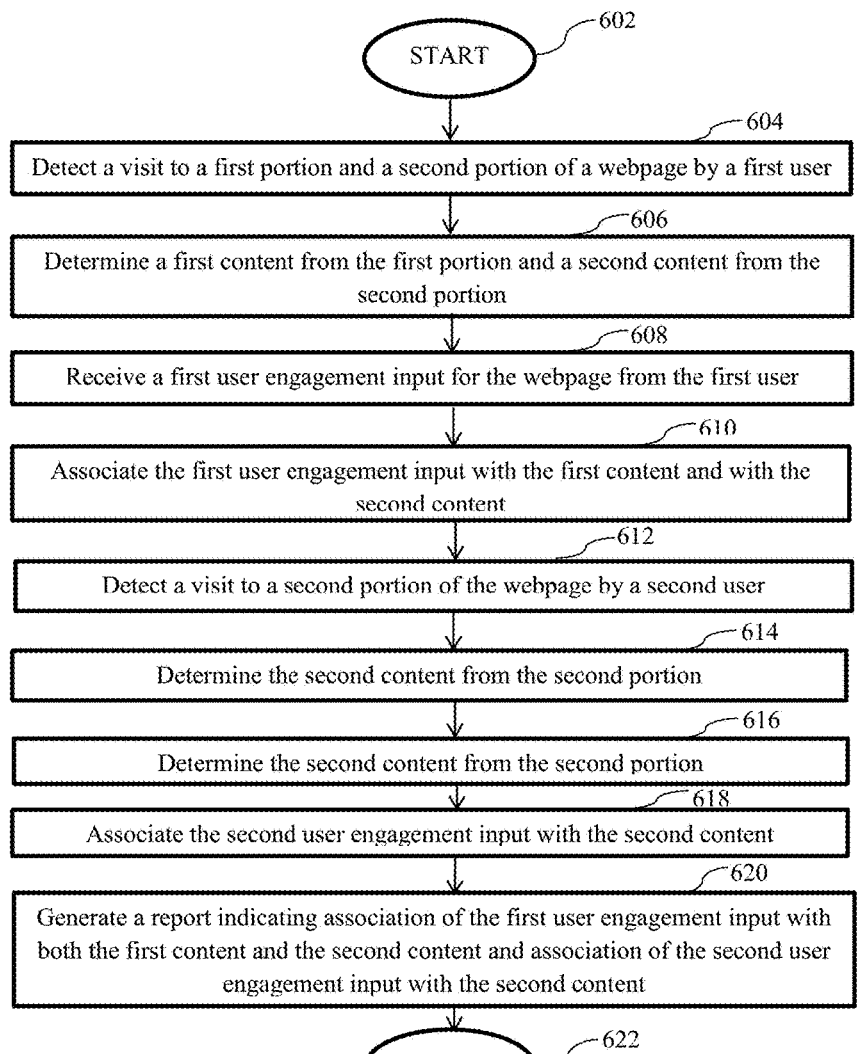
FIG. 6 is a flowchart of a yet another procedure for associating user engagement data received from a user with portions of a webpage visited by the user, according to one or more embodiments.

FIG. 6 is a flowchart of a procedure for associating user engagement data received from a user with portions of a webpage visited by the user by an apparatus, such as the apparatus 302 of FIG. 3, according to one or more embodiments. The procedure is explained with help of a webpage. In one example, the webpage can be a product page, i.e. a webpage describing and associated with a product, and including a plurality of features (plurality of contents) of the product. In another example, the webpage can be a brand page, i.e. a webpage describing and associated with a brand, and including a plurality of products (plurality of contents) of the brand. In yet another example, the webpage can be a blog page, i.e. a webpage blogging about and associated with a product, and including a plurality of features (plurality of contents) of the product. In still another example, the webpage can be a blog page, i.e. a webpage blogging about and associated with a brand, and including a plurality of products (plurality of contents) of the brand. The webpage is enabled for tracking by a marketer of the product or brand. The marketer also enables report generation of social activities performed by a user on the webpage via the apparatus 302.

The procedure starts at step 602 and proceeds to step 604.

At step 604, a visit to a first portion and a second portion of the webpage by a first user is detected. The first user can be any user visiting the webpage and the first portion and the second portion can be any two portions of the webpage visited by the first user. The webpage includes the plurality of contents. The procedure of detecting the visit is similar to the procedure described earlier in FIG. 4 and FIG. 5.

At step 606, the first content from the first portion and the second content from the second portion is determined. The first content from the first portion visited by the first user is extracted using the coordinates and the first content is processed to determine one or more keywords from the first portion. The keywords are representative of the first content described in the first portion of the webpage and are used to determine the first content from the first portion of the webpage visited by the first user. The keywords can be determined using various existing technologies, as described earlier in FIG. 4 and FIG. 5. Similarly, the second content is determined from the second portion of the webpage.

At step 608, first user engagement input is received for entire webpage from the first user using a first user interface and at step 610 the first user engagement input is associated with the first content and the second content, and is not associated with other contents of the webpage not visited by the first user. The webpage includes only one user interface option to provide the first user engagement input of a particular type, at one instance, for entire webpage. The first user engagement input is received by the apparatus 302 using the JavaScript or the cookie based technology or other existing technologies. The first user engagement input includes a click on the "like" button or on the "share" button or an input comment or a rating or a combination of these. A count corresponding to each feature is maintained for each type of the first user engagement input. The webpage is initially parsed and processed using the natural language processing technology to determine all contents described on the webpage. Alternatively, the marketer can provide the list of all contents. Variables corresponding to each type are initialized for each content. Examples of variable include, but are not limited to, Num_Likes, Num_Shares, Num_Comments, Sentiment, Num_rating, and Rating. With each first user engagement input received for the first content the count is incremented for corresponding type of the received first user engagement input. The procedure of associating the first user engagement input or the user engagement data with the first content and the second is described earlier in FIG. 4 and FIG. 5.

At step 612, a visit to the second portion of the webpage by a second user is detected. The second user can be any user visiting the webpage other than the first user. The procedure of detecting the visit is similar to the procedure described earlier in FIG. 4 and FIG. 5.

At step 614, the second content from the second portion is determined. The second content from the second portion visited by the second user is extracted using the coordinates and the second content is processed to determine one or more keywords from the second portion. The keywords are representative of the second content described in the second portion of the webpage and are used to determine the second content from the second portion of the webpage visited by the second user. The keywords can be determined using various existing technologies, as described earlier in FIG. 4 and FIG. 5.

At step 616, second user engagement input is received for entire webpage from the second user via a second user interface and at step 618 the second user engagement input is associated with the second content, and is not associated with other contents (including first content) of the webpage not visited by the second user. The webpage includes only one user interface option to provide the second user engagement input of a particular type, at one instance, for entire webpage. The second user engagement input is received by the apparatus 302 using the JavaScript or the cookie based technology or other existing technologies. The second user engagement input includes a click on the "like" button or on the "share" button or an input comment or a rating or a combination of these. A count corresponding to each feature is maintained for each type of the second user engagement input. The webpage is initially parsed and processed using the natural language processing technology to determine all contents described on the webpage. Alternatively, the marketer can provide the list of all contents. Variables corresponding to each type are initialized for each content. Examples of variable include, but are not limited to, Num_Likes, Num_Shares, Num_Comments, Sentiment, Num_rating, and Rating. With each second user engagement input received for the first content the count is incremented for corresponding type of the received second user engagement input. The procedure of associating the second user engagement input or the user engagement data with the first content and the second is described earlier in FIG. 4 and FIG. 5.

The second user engagement input can be of same type as the first user engagement input or can be of different type.

At step 620, the report indicating association of the first user engagement input or the first user engagement data with the first content and to the second content, and non-association of the first user engagement input or the first user engagement data with other contents of the webpage is generated. The report also indicates association of the second user engagement input or the second user engagement data with the second content, and non-association of the second user engagement input or the second user engagement data with other contents (including the first content) of the webpage is generated. The report can be generated and stored for rendering as and when required by the marketer or can be generated in real time. The marketer can access an online portal provided by the apparatus 302 for accessing the services offered by the apparatus 302. Using the online portal and offered user interface of the online portal, the report is accessed by the marketer. The report includes granular analysis of the user engagement data and helps marketer in altering the webpage in a more meaningful manner.

The procedure stops at step 622.

Example Snapshots

Figure 7:
FIG. 7 is a diagram of another report, according to one or more embodiments.

FIG. 7 shows a sample report 700 indicating association of the user engagement inputs (collectively referred to as user engagement data) with various portions, i.e. features of the product, of the webpage. The report 700 indicates that a total of 30 users rated the product on the webpage 100. Meaningful and granular details are available to the marketer from the report 700, such as feature 1 drove 26 users to rate the product on the webpage 100 with average rating of 4.38. The report 700 also provides break-up for these 26 users, i.e. 14 users who visited feature 1 provided a rating of 5 etc.

Figure 8:
FIG. 8 is a diagram of yet another report, according to one or more embodiments.

FIG. 8 shows a sample report 800 indicating association of the user engagement inputs (collectively referred to as user engagement data) with various portions, i.e. features of the product, of the webpage. The report 800 indicates that a total of 38 users commented positively on the product on the webpage 100. Meaningful and granular details are available to the marketer from the report 800, such as feature n drove 10 users to comment positively on the product on the webpage 100.

The embodiments of the present invention may be embodied as procedures, apparatus, electronic devices, and/or non-transient computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium.

More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for associating user engagement data with various features of a product described on a webpage, the method comprising:
  detecting, by at least one processor, a visit by a user to a webpage, the webpage comprising a user interface option by which the user can provide user engagement input, and further comprising a plurality of features of a product, each of the plurality of features indicated by a description comprising one or more keywords;
  determining coordinates of a portion of the webpage visited by the user and that the user visited for at least a threshold period of time;
  analyzing, based on determining that the user visited the portion of the webpage for at least the threshold period of time, the visited portion of the webpage using the at least one processor to identify a feature of the product from within the plurality of features indicated by keywords identified within the visited portion of the webpage;
  receiving, by way of the user interface option, a user engagement input for the webpage;
  determining a type of the user engagement input;
  associating, based on the type of the user engagement input, a value with the feature identified from the visited portion of the webpage; and generating a report indicating association of the user engagement input with the identified feature.

2. The method of claim 1, wherein the type of the user engagement input comprises at least one of a like input, a share input, a rating input, or a comment input.

3. The method of claim 2, wherein the type of the user engagement input comprises a comment input, the method further comprising:
   determining that the comment input does not comprise a keyword corresponding to the identified feature of the product;
   determining, based on the determination that the comment input does not comprise a keyword corresponding to the identified feature, a sentiment score of the comment input; and
   associating the sentiment score with the identified feature of the product.

4. The method of claim 2, wherein the type of the user engagement input comprises a comment input, the method further comprising:
   determining that the comment input comprises at least one keyword corresponding to the identified feature of the product;
   determining, based on the determination that the comment input comprises at least one keyword corresponding to the identified feature, a sentiment score of the at least one keyword corresponding to the determined feature of the product; and
   associating the sentiment score with the identified feature of the product.

5. The method of claim 4, wherein the type of the user engagement input further comprises a rating input, the method further comprising:
   associating the rating input with the determined feature of the product based on:
      the sentiment score of the at least one keyword corresponding to the identified feature, and
      an average of sentiment scores of every other feature of the product associated with any other keywords mentioned in the comment input.

6. The method of claim 1, wherein determining the coordinates of the portion of the webpage visited by the user comprises utilizing the at least one processor to track one or more of eye location of the user on the webpage, mouse cursor movement on the webpage, or scrolling behavior of the user on the webpage.

7. The method of claim 6, wherein determining the coordinates of the portion of the webpage visited by the user further comprises embedding script in the webpage to enable receiving the coordinates from a device by which the user views the webpage.

8. The method of claim 1, wherein associating the value with the identified feature comprises incrementing a count of a number of times the type of the user engagement input is received in relation to the identified feature.

9. A system for associating user engagement data with various contents of a webpage, the system comprising:
   at least one processor; and
   a non-transitory computer readable medium comprising instructions that, when executed by at least one processor, cause the system to:
      detect a visit by a user to a webpage, the webpage comprising a user interface option by which the user can provide user engagement input, and further comprising a plurality of contents, each content comprising one or more keywords;
      determine coordinates of a portion of the webpage visited by the user and that the user visited for at least a threshold period of time;
      analyze, based on determining that the user visited the portion of the webpage for at least the threshold period of time, the visited portion of the webpage using the at least one processor to identify a first content from the plurality of contents indicated by keywords within the visited portion of the webpage;
      receive, by way of the user interface option, a user engagement input for the entire webpage;
      determine a type of the user engagement input; and
      associate the user engagement input with the first content; and
      refrain from associating the user engagement input with other contents on the webpage.

10. The system of claim 9, wherein the type of the user engagement input comprises at least one of a like input, a share input, a rating input, or a comment input.

11. The system of claim 10, wherein the type of the user engagement input comprises a comment input, the system further comprising instructions that, when executed by the at least one processor, cause the system to:
   determine that the comment input does not comprise a keyword corresponding to the first content;
   determine, based on the determination that the comment input does not comprise a keyword corresponding to the first content, a sentiment score of the comment input; and
   associate the sentiment score with the first content.

12. The system of claim 10, wherein the type of the user engagement input comprises a comment input, the system further comprising instructions that, when executed by the at least one processor, cause the system to:
   determine, that the comment input comprises at least one keyword corresponding to the first content;
   determine, based on the determination that the comment input comprises at least one keyword corresponding to the first content, a sentiment score of the at least one keyword corresponding to the first content; and
   associate the sentiment score with the first content.

13. The system of claim 12, wherein the type of the user engagement input further comprises a rating input, the system further comprising instructions that, when executed by the at least one processor, cause the system to:
   associate the rating input with the first content based on:
      the sentiment score of the at least one keyword corresponding to the first content, and
      and average of sentiment scores of every other content associated with any other keywords mentioned in the comment input.

14. The system of claim 9, wherein the instructions cause the system to determine the coordinates of the portion of the webpage visited by the user by utilizing the at least one processor to track one or more of eye location of the user on the webpage, mouse cursor movement on the webpage, or scrolling behavior of the user on the webpage.

15. The system of claim 14, wherein the instructions cause the system to determine the coordinates of the portion of the webpage visited by the user by further embedding script in the webpage to enable receiving the coordinates from a device by which the user views the webpage.

16. The system of claim 9, wherein the instructions cause the system to associate the user engagement input with the first content by incrementing a count of a number of times the type of the user engagement input is received in relation to the first content.

17. The system of claim 9, further comprising instructions that, when executed by the at least one processor, cause the system to generate a report indicating association of the user engagement input with the first content and non-association of the user engagement input with other contents on the webpage.

18. The system of claim 9, wherein the plurality of contents comprises one or more of:
- a plurality of features of a product described on the webpage; or
- a plurality of products of a brand described on the webpage.

19. A non-transitory computer readable medium for associating user engagement data with various portions of a webpage, the non-transitory computer readable medium comprising instructions that, when executed by at least one processor, cause a computer device to:
- detect a visit by a first user to a webpage;
- determine coordinates of a first portion and a second portion of the webpage visited by the first user and that the first user visited the first portion and the second portion for at least a threshold period of time;
- analyze, based on determining that the first user visited the first portion for at least the threshold period of time, the first portion of the webpage to identify a first content, wherein the first content comprises a description of a first feature of a product indicated by a first set of keywords within the first portion;
- analyze, based on determining that the first user visited the second portion for at least the threshold period of time, the second portion of the webpage to identify a second content, wherein the second content comprises a description of a second feature of the product indicated by a second set of keywords within the second portion;
- receive a first user engagement input for the webpage from the first user via a first user interface option;
- associate, based on determining that the first user visited the first portion and the second portion for at least the threshold period of time, the first user engagement input with the first feature of the product and the second feature of the product;
- detect, based on the coordinates of the second portion, a visit to the second portion of the webpage by a second user;
- analyze, based on determining that the second user visited the second portion for at least the threshold period of time, the second portion of the webpage to identify the second content, wherein the second content comprises the description of the second feature of the product indicated by the second set of keywords within the second portion;
- receive a second user engagement input for the webpage from the second user via a second user interface option;
- associate, based on determining that the second user visited the second portion for at least the threshold period of time, the second user engagement input with the second feature of the product; and
- generate a report indicating association of the first user engagement input with both the first feature of the product and the second feature of the product, and association of the second user engagement input with the second feature of the product.

20. The non-transitory computer readable medium of claim 19, further comprising instructions that, when executed by the at least one processor, cause the computer device to refrain from associating the second user engagement input with the first feature of the product.

* * * * *